(No Model.) 7 Sheets—Sheet 1.
C. W. & W. F. HUNT.
ROTARY CAM GEAR.
No. 498,552. Patented May 30, 1893.

Witnesses
Chas H Smith
J. Staib

Inventors
C. W. Hunt
W. F. Hunt
per Lemuel W. Serrell
Atty.

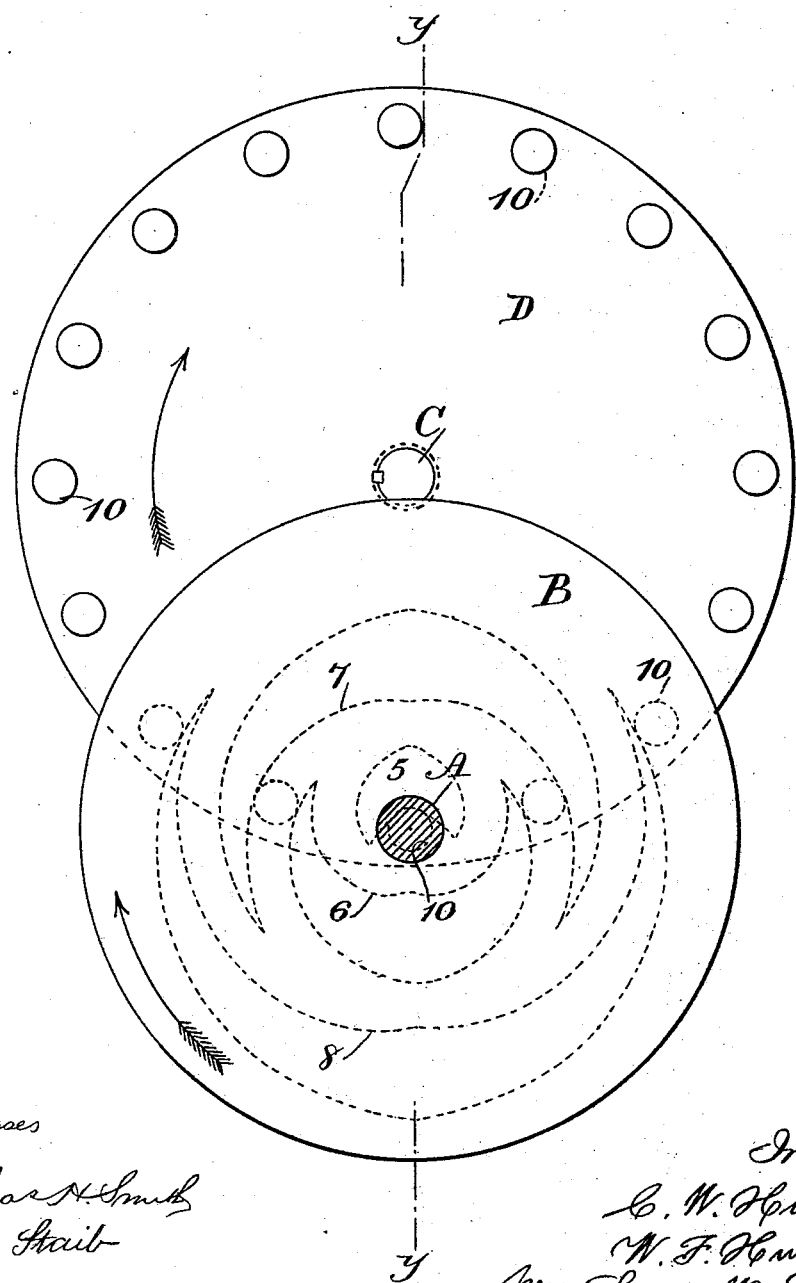

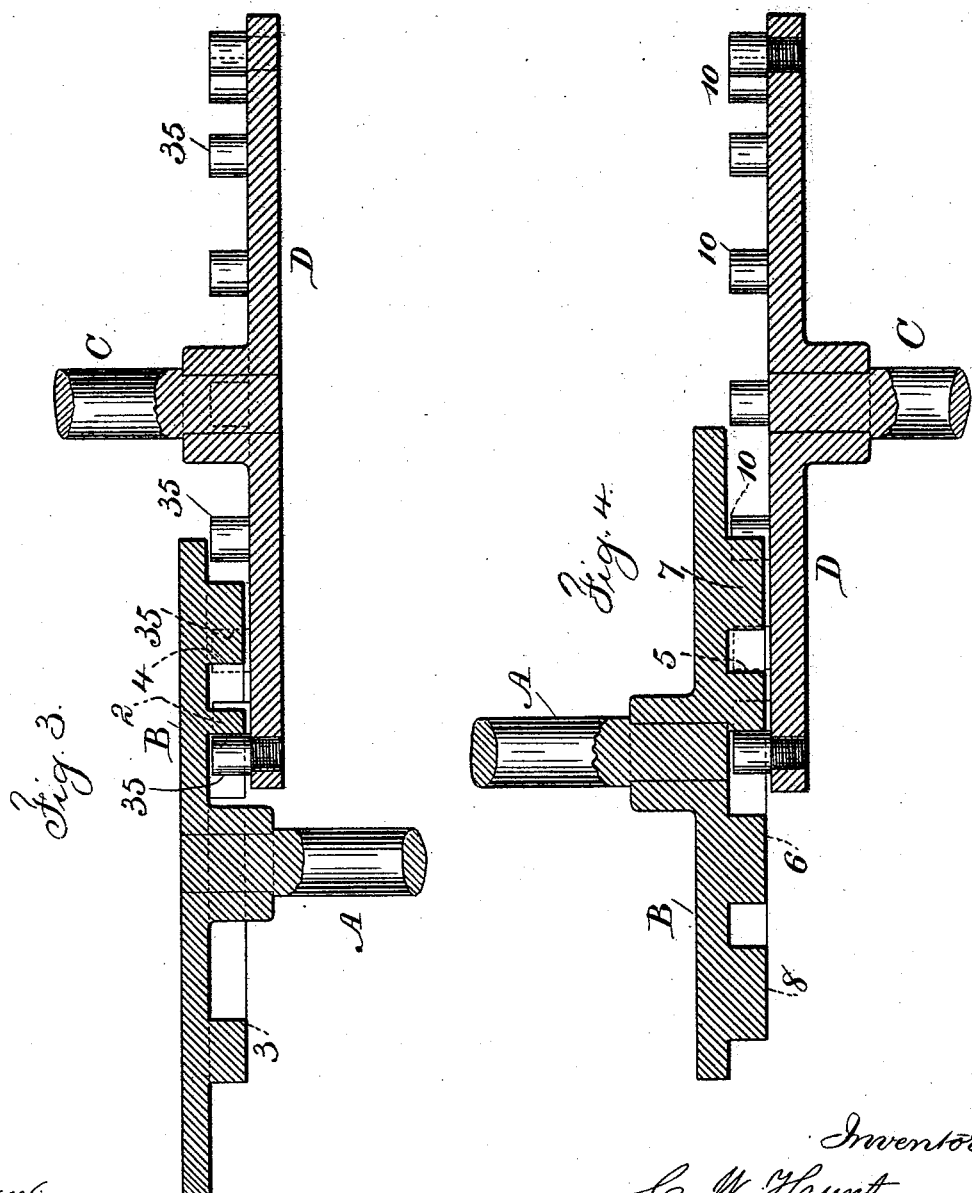

(No Model.) 7 Sheets—Sheet 4.
C. W. & W. F. HUNT.
ROTARY CAM GEAR.

No. 498,552. Patented May 30, 1893.

Witnesses
Chas. H. Smith
J. Staib

Inventors
C. W. Hunt
W. F. Hunt
per Lemuel W. Serrell
Atty (No Model.) 7 Sheets—Sheet 5.

C. W. & W. F. HUNT.
ROTARY CAM GEAR.

No. 498,552. Patented May 30, 1893.

Witnesses
Chas. H. Smith
J. Staib

Inventors
C. W. Hunt
W. F. Hunt
per Lemuel W. Serrell
Atty.

(No Model.) 7 Sheets—Sheet 6.
C. W. & W. F. HUNT.
ROTARY CAM GEAR.

No. 498,552. Patented May 30, 1893.

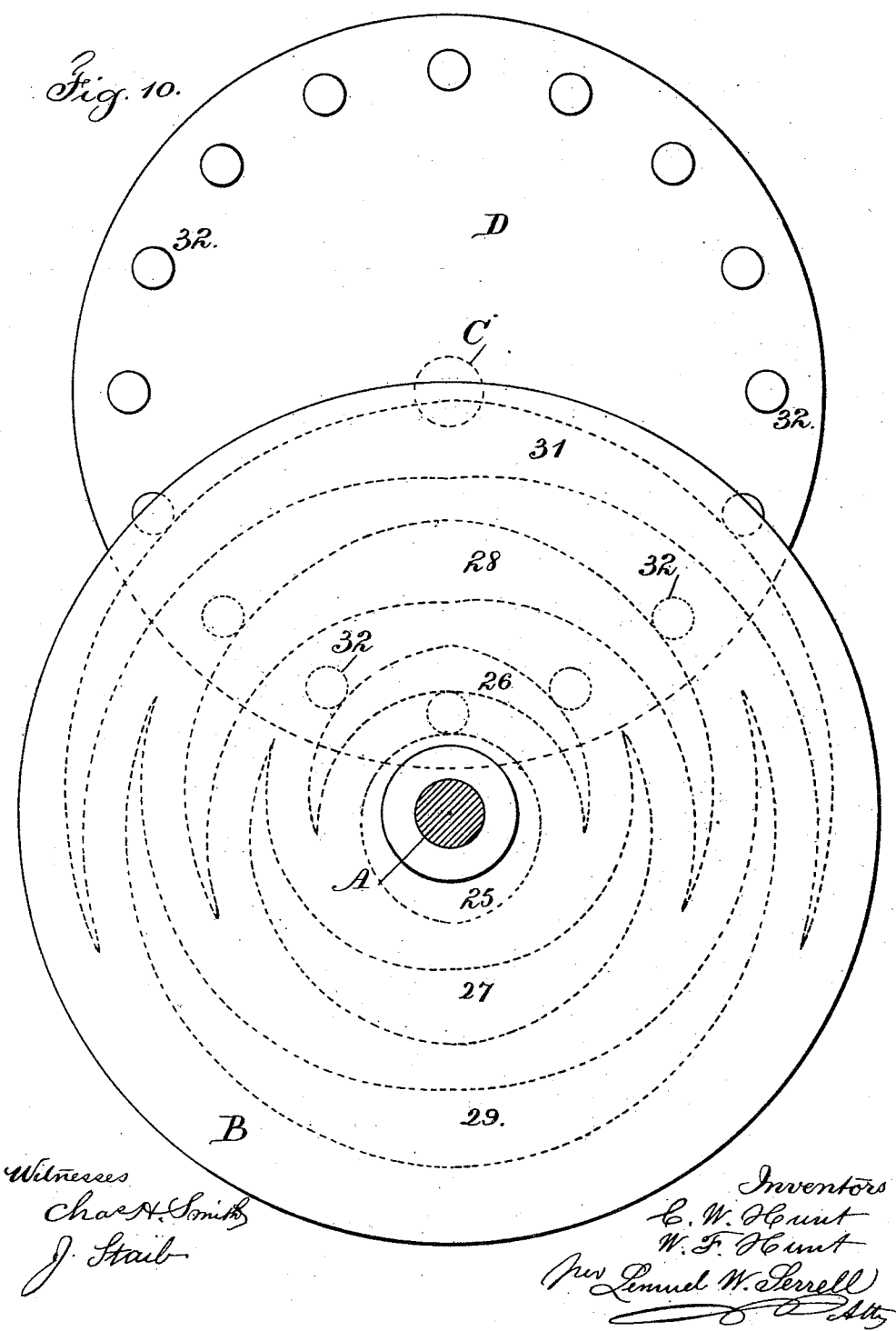

UNITED STATES PATENT OFFICE.

CHARLES W. HUNT AND WILLIAM F. HUNT, OF WEST NEW BRIGHTON, NEW YORK.

ROTARY CAM-GEAR.

SPECIFICATION forming part of Letters Patent No. 498,552, dated May 30, 1893.

Application filed December 12, 1892. Serial No. 454,845. (No model.)

*To all whom it may concern:*

Be it known that we, CHARLES W. HUNT and WILLIAM F. HUNT, citizens of the United States, residing at West New Brighton, in the county of Richmond and State of New York, have invented an Improvement in Rotary Cam-Gears, of which the following is a specification.

In giving motion from a rotary body to a second rotary body or to a longitudinally moving rack, a volute groove has been made use of in the rotating body for the reception of the pins or teeth upon the body to be moved, but the rotating body was necessarily conical and the cam-shaped surfaces of the volute ribs acted at one side of the axis of rotation only because the cam surfaces inclined in the opposite direction at the other side of the axis of rotation. For this reason the rotating body could not be flat and parallel to the line of motion given to the body that is moved.

In our present invention the moving body can be substantially flat or more or less curved and there are two volute grooves therein passing in opposite directions so that the intermediate projections become cams or lune-shaped ribs, and this moving body, revolving upon an axis, gives motion to the teeth or pins of an adjacent wheel, rack or other body to be moved and the parts are so constructed and arranged that a regular progressive movement is given to the body that is moved, or such movement may be faster at one time than at another according to the shape of the cams formed by the intersecting volutes.

The present mechanism is especially adapted to use in hoisting machinery, and in tipping buckets containing melted slag and other materials and where the rotating shaft has considerable leverage against the device to be moved and where the volute grooves are employed to hold the article moved without the use of separate ratchet wheels and pawls.

Figure 1:
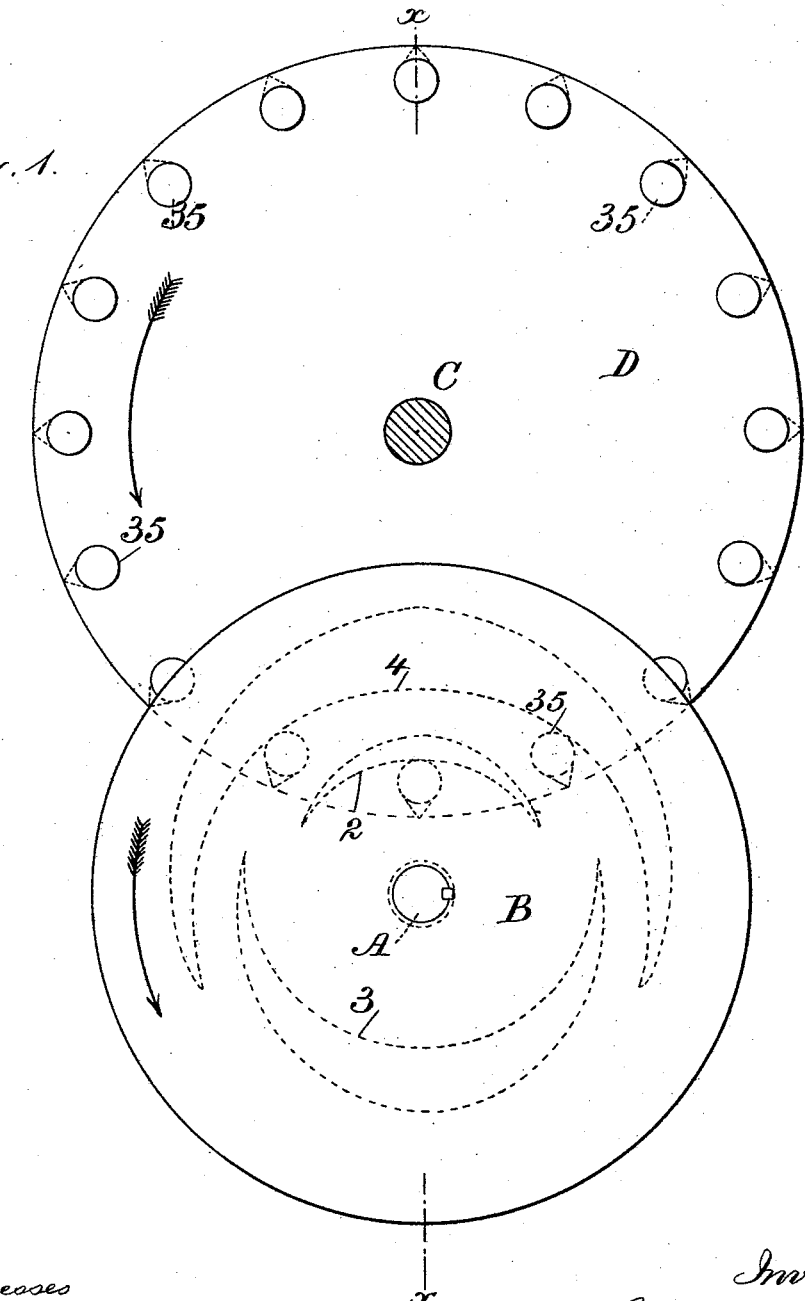
Figure 5:
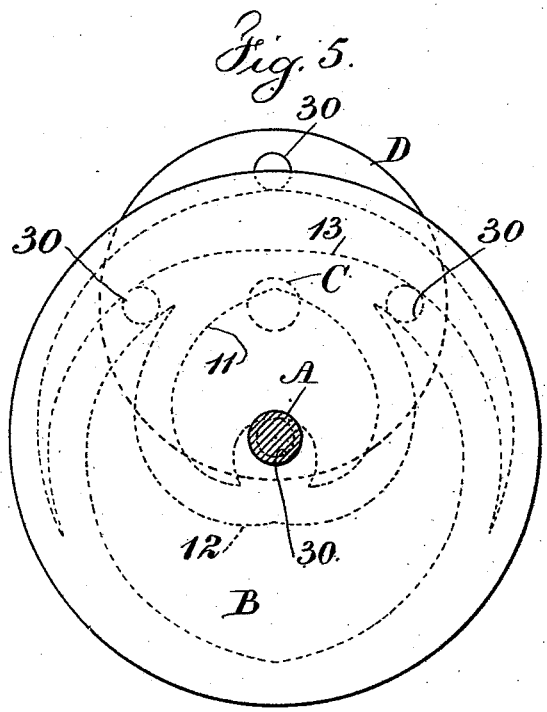
Figure 6:
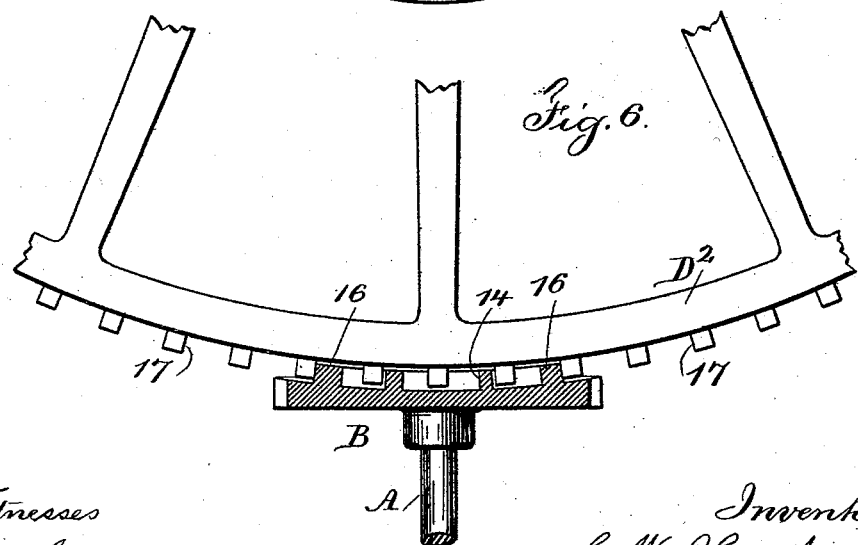
Figure 7:
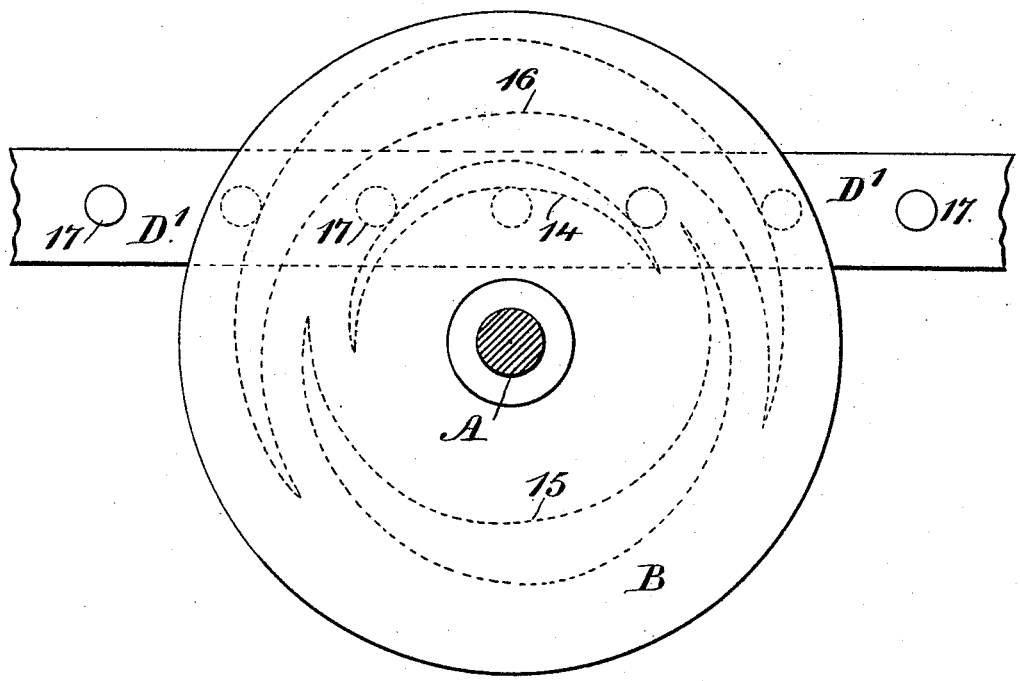
Figure 8:
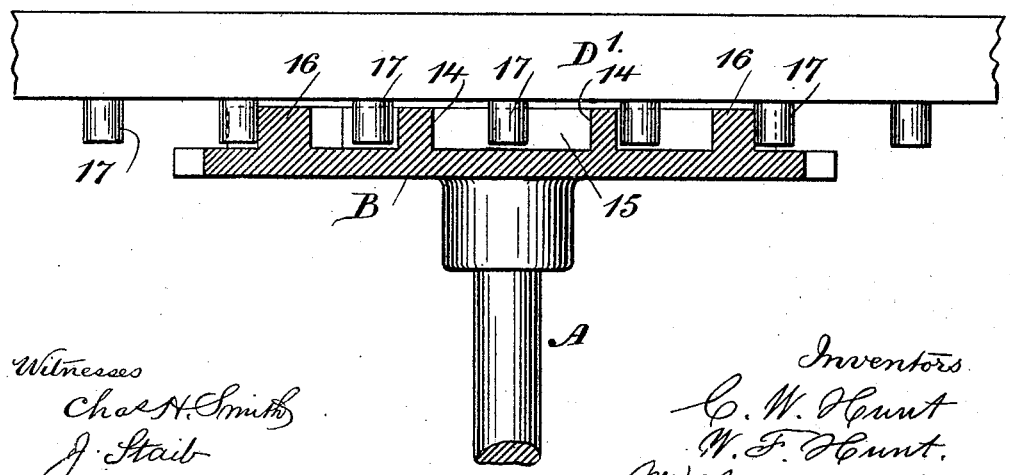
Figure 9:
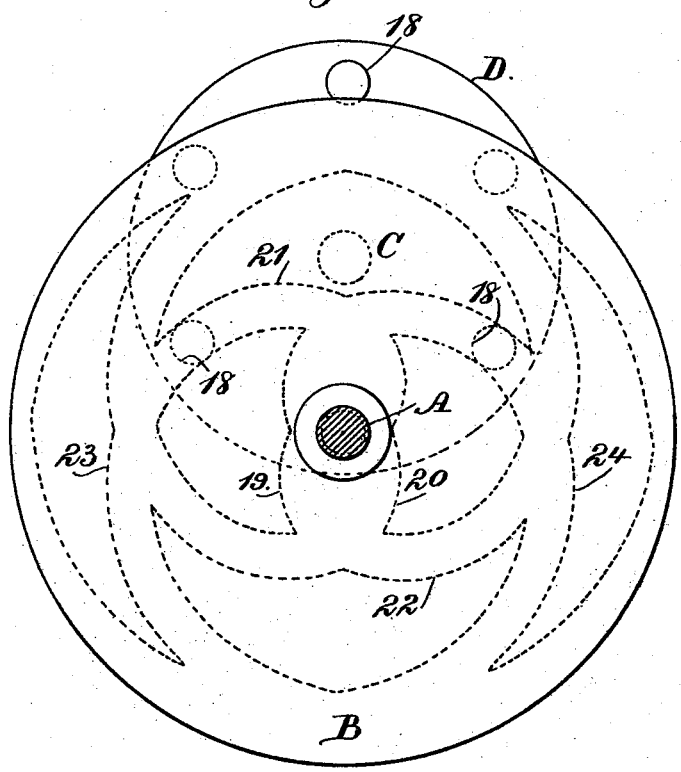

In the drawings, Figure 1 represents a motor disk and a circular wheel with pins to be moved thereby. Fig. 2 is a similar view in which the pins to be moved pass across the axis of rotation of the motor. Fig. 3 is a sectional plan at the line $x\,x$ of Fig. 1, and Fig. 4 is a sectional plan at the line $y\,y$ of Fig. 2. Fig. 5 represents a motor disk acting upon a wheel with four pins. Fig. 6 is a section of a motor wheel and an elevation of a portion of a wheel with the pins upon the periphery thereof. Fig. 7 is an elevation of a motor disk acting upon a straight bar or rack with pins, and Fig. 8 is a plan view of the same, the motor disk being in section. Fig. 9 represents a motor disk as acting upon a wheel with six pins. Fig. 10 is an elevation representing a motor disk acting upon a wheel with numerous pins and numerous lune-shaped cams.

A represents the motor shaft, B the motor wheel or disk, C the shaft to be moved, and D the disk or wheel thereon.

In Fig. 1 the cams 2, 3 4 taper toward their ends and they are the projecting portions of the disk between volute grooves passing in opposite directions upon the face of the motor wheel or disk B, and the pins 35 are acted upon in succession by the cams of the motor disk B, and it will be apparent that when the motor disk B is rotated in the direction of the arrow, the wheel or disk D will be moved in the same direction and to the extent of one pin 35 each rotation of said motor disk B, and the shapes of the cams 2, 3 and 4 are made with reference to giving a uniform movement to the disk D and shaft C; and it will be apparent that the pins 35 may either be circular or elongated, as indicated by dotted lines, and also that the movement given from the motor wheel to the disk or wheel D may be in either direction according to the direction of rotation of the motor shaft A.

The description of Fig. 1 applies to Fig. 2 but it will be observed that in this case the lune cams are differently shaped and positioned, in consequence of the pins 10 crossing the axis of rotation or nearly so, and in this figure there are four lune-shaped cams 5, 6, 7, 8. The cams represented in Fig. 5 are of different shape to those in either of the other figures because there are but four pins 30 upon the disk to be moved, and the cams 11, 12 and 13 are formed by the projections between the volute grooves in the surface of the motor disk, said grooves passing in opposite directions and being so laid out and proportioned as to act correctly upon the pins 30 in giving a regular progressive movement to the same.

In Figs. 7 and 8 the motor disk is represented with the lune-shaped cams 14, 15, 16, and as acting upon the pins 17 upon the rack D', and in these figures the progressive movement will be given to the rack when the motor disk is revolved in either direction, the double volute grooves and the intermediate lune-shaped cams 14, 15, 16 being laid out with reference to the pins of the rack travelling at one side of the axis of rotation of the motor shaft.

In Fig. 6 a motor wheel with grooves similar to that shown in Fig. 7 is illustrated, but the face thereof is concave so as to be adapted to act upon the segment of a wheel or upon a wheel $D^2$ having teeth or projecting pins around the periphery thereof.

In Fig. 9 the number of pins 18 upon the disk to be moved being greater there are more convolutions to the volute grooves and a larger number of lune-shaped cams between such grooves, and in consequence of the peculiar disposition of the parts, the cams 19 and 20 are opposite to each other, so also are the cams 21, 22, 23 and 24, and in this figure and in Fig. 10 the number of convolutions of the volute grooves in opposite directions being increased the number of lune-shaped cams is increased, and in Fig. 10 these lune-shaped cams are numbered 25, 26, 27, 28, 29 and 31 and they are adapted to act upon the pins 32 upon the disk or wheel to be moved.

In Fig. 10 one tooth or projection is taken up each rotation of the motor disk and this figure is similar to Fig. 1, except that the number of cams is increased and there is a greater number of pins that are being acted upon simultaneously.

In Fig. 9 the volute grooves are so disposed in relation to the pins that the disk is moved two pins each revolution of the motor.

We claim as our invention—

A motor shaft and a disk having in its substantially flat surface volute grooves running in opposite directions and crossing each other, the intermediate projections forming lune-shaped cams, in combination with the part to be moved having projections passing into the grooves and against which the cams act, substantially as specified.

Signed by us this 5th day of December, 1892.

CHAS. W. HUNT.
WM. F. HUNT.

Witnesses as to signature of Chas. W. Hunt:
GEO. T. PINCKNEY,
WILLIAM G. MOTT.

Witnesses as to signature of Wm. F. Hunt:
CHARLES H. BLOOD,
WM. HAZLITT SMITH.